Dec. 4, 1923.

P. H. LINT

FRUIT GATHERING MACHINE

Filed Oct. 19, 1920

INVENTOR
P. H. LINT

ATT'YS

Patented Dec. 4, 1923.

1,476,207

UNITED STATES PATENT OFFICE.

PETER H. LINT, OF LOS GATOS, CALIFORNIA.

FRUIT-GATHERING MACHINE.

Application filed October 19, 1920. Serial No. 418,013.

*To all whom it may concern:*

Be it known that I, PETER H. LINT, a citizen of the United States, residing at Los Gatos, in the county of Santa Clara and State of California, have invented new and useful Improvements in Fruit-Gathering Machines, of which the following is a specification.

The present invention relates to improvements in machines for picking up prunes and other fruits from the ground.

One of the objects of the invention is to generally improve and simplify the construction and operation of fruit gathering devices of the type disclosed in Letters Patent of the United States issued to me as follows: 1,035,613 of August 13, 1912; 1,104,431 of July 21, 1914; 1,136,249 of April 20, 1915; 1,222,878 of April 17, 1917; 1,317,927 of October 7, 1919.

Another object of the invention is to provide a fruit gatherer which is constructed so that possibility of not picking up all the fruit encountered thereby is lessened and the picking or gathering operation is made more accurate and certain.

Another object of the invention is to provide novel, simple and effective means for depositing the fruit picked up into a receptacle therefor and for separating the foreign matter, such as leaves and other débris from the fruit, the picking up and separating operation being effected without mutilating, crushing, or otherwise damaging the fruit.

The invention possesses other advantages and features some of which, with the foregoing will be set forth at length in the following description where I shall outline in full that form of the invention which 1 have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings:—

Figure 1:
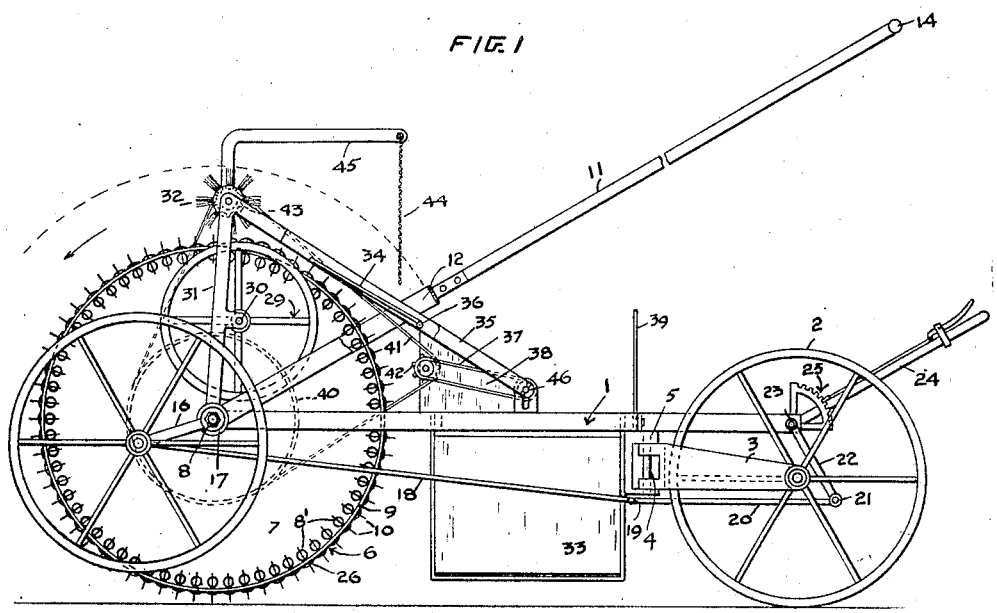
Figure 1 is a side elevation partly broken away to better illustrate the invention, of a fruit gatherer constructed in accordance with the present invention.
Figure 2:
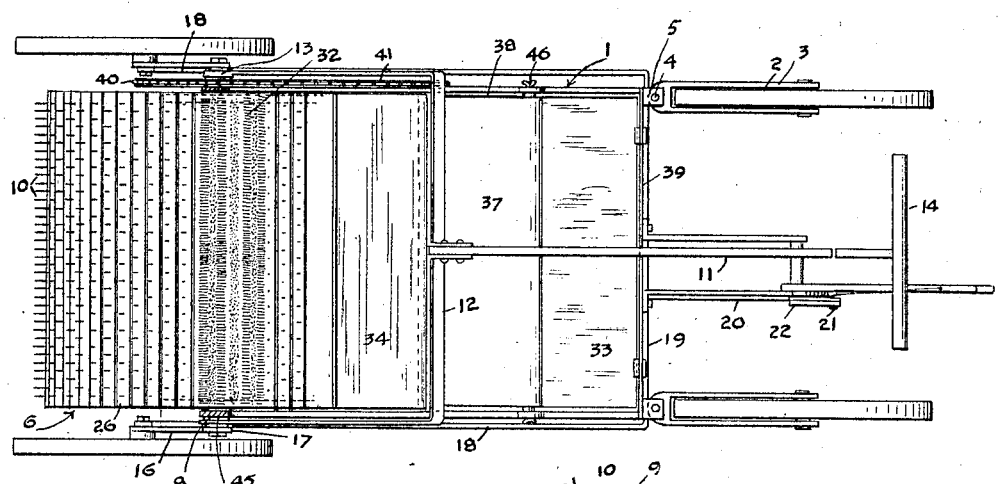
Figure 2 is a top plan view of a gatherer.
Figures 3, 4:
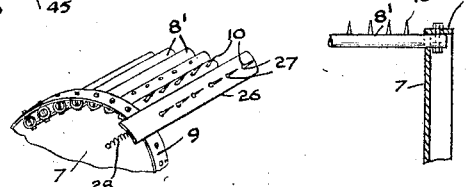
Figure 3 is a fragmentary detail perspective view of the gatherer or picking up drum.
Figure 4 is a detail fragmentary sectional view showing the manner of connecting the parts of the drum.

Referring to the present embodiment of the invention as illustrated in the accompanying drawing, there is provided a vehicle frame 1 of rectilinear outline and which is preferably formed of suitable though light metal. At the rear end of this frame, wheels 2 are mounted. The wheels are supported upon horizontal arms 3 which are mounted upon vertical pivots 4 in brackets 5 suitably secured to the rear end of the frame 1. These arms swing in horizontal plane and are bifurcated so as to receive the wheels 2 therein. By so mounting the rear wheels, the turning of the machine in a small space is facilitated.

Rotatably mounted between the front ends 1 of the frame is a cylindrical drum generally designated 6. This drum comprises two circular heads 7 which are rotatably journalled upon trunnions 8 carried by the frame 1. Fixed to the peripheries of the heads 7 are a plurality of closely associated tubular members 8' which form the surface of the drum. Surrounding the drum at the ends thereof are annular flanges 9 of the heads 7. Inserted from the inside of the drum through the tubular members 8 and the bands 9 are a plurality of teeth 10, which in this instance are radial to the center of the drum but may be otherwise disposed if so desired. These teeth are pointed and are arranged far enough apart, to cause the pieces of fruit encountered thereby to be either impaled thereon or wedged therebetween, the drum being so arranged that the teeth will contact lightly with the surface of the ground over which the machine is to be operated. The entire drum is made relatively light so as to have as little tendency to crush the fruit, as possible.

To provide for operation of the machine either as to pushing or pulling it over the ground, there is provided a handle or tongue 11 connected with a yoke 12, the free ends of which are pivoted as at 13 to the trunnions 8. The handle 11 is provided with a cross piece 14 at its outer end. The yoke 12 is so constructed that it may be turned as indicated by the dotted line in Figure 1 to present the handle either at the forward or rear end of the machine, whereby the operator may either push or pull the machine.

To facilitate the moving of the machine over the ground without causing the teeth of the drum to contact with the ground, as is required in moving the machine to and from the place of operation, there are provided vertically adjustably mounted front wheels 15 connected with the forward end of the frame. These wheels are rotatably mounted upon the lower ends of the swinging arms 16, the other ends of which are pivotally mounted as at 17 to the trunnions 8. The lower or outer ends of the arms 16 have rods 18 connected thereto, which rods are extended rearwardly and joined to a cross bar 19. From the cross bar 19, an arm 20 extends rearwardly and is pivotally connected as at 21, to the lower end of a lever operated arm 22. The arm 22 is pivoted as at 23 to the lower end of a lever 24, which latter is operatively associated with lever-locking mechanism generally designated 25. With the lever and associated parts in position shown in Figure 1, the wheels 15 are maintained in raised position and permit the drum to assume operating position. By shifting the lever 24, the arms 22, 20 and rod 18 are so moved that the wheels 15 will be disposed in working position and the drum 6 will be lifted from the ground engaging position.

To insure the removal of the pieces of fruit from the drum after they have been picked up by the teeth, there is mounted upon each transverse row of teeth a disengaging slat or strip 26. The strips 26 have a plurality of openings 27 therein through which the teeth extend and said strips are normally held inward upon the members 8, with the teeth fully projecting therefrom, by the action of the retractile springs 28. The springs are connected at their ends with the strips 26 and with the drum heads 7, the outer ends of said strips being projected beyond the ends of the drum.

To provide for the outward movement of said strips to effect the disengaging action and to remove the fruit from being held on the drum by the teeth, there are provided cam elements in the form of wheels or rollers 29. These rollers 29 are journalled as at 30 upon frame pieces 31 which extend upwardly from the frame 1 at opposite ends of said drum. The upper sides of the rollers 29 project above the upper side of the drum at points just rearwardly of the uppermost point of said drum, and the drum in rotating from left to right causes the ends of the strips or slots 26 to encounter the peripheries of the rollers, whereby said strips are forced outwardly and disengage the fruit and débris. Upon the uppermost part of the frame 31 just forwardly of the upwardly projecting part of the roller 29 is mounted a rotary brush 32.

The means for delivering the fruit into a receptacle 33 which latter is carried by the frame 1 rearwardly of the drum 6 and for separating the débris from the fruit comprises a chute 34 which is mounted upon a rearwardly and downwardly inclined member 35 of the frame 31. The chute 31 is pivoted or hinged at its lower end as at 36 between and to said members 35 and the upper end thereof rests lightly upon the teeth at a point just rearward of the projected portions of the rollers 29. Disposed beneath the lower end of said chute 34 is an endless conveyor 37 which is inclined slightly downwardly and rearwardly, to a point over the receptacle 33. The endless conveyor is mounted between side walls 38 attached to the frame pieces 35 and 31 respectively. Arranged forwardly of the conveyor 37 at the outermost extremity of the receptacle 33 is a guard plate 39 which projects well upwardly above the conveyor 37 and serves as a means for preventing the fruit from being directed rearwardly over the top of and beyond said receptacle.

The means for operating the endless conveyor 37 and brush 32 comprises a pulley or sprocket wheel 40 attached to one end of the drum 6 and operatively associated with said endless conveyor and brush, by means of a chain or belt 41, which latter is extended around an operating sprocket 42 on the conveyor and a similar sprocket 43 on the brush 32.

As a means for preventing the fruit and débris, such as small rocks or other débris particularly the latter from being directed rearwardly by the brush 32 and into the receptacle without coming into contact with and being carried off by the conveyor 37, there is provided a flexible apron 44, which latter depends from an extension 45 of the frame 31 and hangs vertically above the chute adjacent to the lower end thereof.

In the operation of the machine, the operator may either pull or push the machine over the ground where the fruit lies, with the drum 6 in the position shown in Figure 1. As the teeth of the drum encounter the fruit, the fruit either wedges between the teeth or becomes impaled thereon as the drum revolves. When the slats or strips 26 encounter the rollers 29, said slats or strips are pushed outwardly and disengage the fruit from said teeth. This occurs at a point where force of gravity together with action of the brush 32, causes the fruit to be directed rearwardly and downwardly onto the chute 34. The chute 34 in lightly contacting with the teeth and because of its being hinged or pivoted will oscillate and insure the downward and rearward sliding of the fruit and débris thereon. The brush in addition to pushing the fruit rearwardly and insuring the disengaging of the fruit from the teeth also cleans the teeth by removing therefrom débris, such as leaves, twigs, small stones, etc., and directs the débris onto the chute 34. Should the brush direct the débris rearwardly too forcibly, said débris will engage the flexible apron 44 and said apron will prevent the débris from being thrown into said receptacle 33. By having the curtains 44 flexible, all possibility of clogging at this point is eliminated. The bars 35 projecting above the member 34 act as guides and prevent the fruit from rolling off the sides of the chute. The fruit and débris will roll off of the lower end of the chute 34 and onto the inclined conveyor 37. This conveyor is rotated in a direction opposite to the movement of the fruit thereover, which movement of the fruit is caused by the rearward and downward inclination of the conveyor. Because of this rotation, the débris, being lighter than the fruit will be carried forwardly and discharge over the forward end of the conveyor, dropping onto the ground between the receptacle 33 and drum 6. The fruit being heavier than the débris, will gravitate into the receptacle 33. The conveyor is preferably made so that it may be vertically adjusted by means shown at 46. This will provide for variation of the pitch of said conveyor, which pitch must be increased when the fruit is exceptionally ripe and soft.

I claim:—

1. A fruit harvester embodying in its construction a wheeled frame capable of being moved over the ground, a drum mounted on the frame, a plurality of teeth projecting from the periphery of the drum and adapted to engage and pick up fruit over which the drum is rolled, means movable outwardly relative to the teeth for pushing the fruit from off the teeth, means for automatically operating said last named means at a predetermined time and a chute onto which fruit rolls when disengaged from the teeth, which chute is pivoted at one end and at its other end lies close to the teeth adjacent the upper side of the drum.

2. A fruit harvester embodying in its construction a wheeled frame adapted to be moved over the ground, a drum rotatably mounted upon the frame, a plurality of teeth projecting from the drum and arranged to engage and pick up fruit lying upon the ground over which the drum is moved, a receptacle carried by the frame, a plurality of members movable inwardly and outwardly relative to the teeth and acting to disengage the teeth from the fruit when moved outwardly, means for automatically effecting movement of said members in an outward direction to disengage the fruit from the teeth, a chute onto which fruit rolls after being disengaged from the teeth, which chute is pivoted adjacent one end and lies close to the teeth adjacent the upper side of the drum, said receptacle receiving the fruit from said chute and a flexible apron depending from a point on the frame above said chute, with its lower end in close proximity to the upper surface of the chute.

3. In a fruit harvester a frame, a drum revolvable upon the frame, a plurality of teeth projecting from the periphery of the drum and adapted to pick up fruit over which the drum is rolled, means for automatically disengaging the fruit from the teeth and a rotary brush mounted above the drum in close proximity to the disengaging means and arranged to engage the fruit simultaneously with the disengaging of the fruit thereof from the teeth, said brush having its bristles arranged to contact with the teeth in order to remove débris therefrom and means operating to rotate the brush during the operation of the drum.

PETER H. LINT.